March 11, 1947. T. H. WINKELJOHN 2,417,390

OIL SEALING RING

Filed June 12, 1944

INVENTOR.
Thomas H. Winkeljohn
BY
Evans + McCoy
ATTORNEYS

Patented Mar. 11, 1947

2,417,390

UNITED STATES PATENT OFFICE 2,417,390

OIL SEALING RING

Thomas H. Winkeljohn, Wabash, Ind., assignor to The General Tire & Rubber Company, Akron, Ohio, a corporation of Ohio Application June 12, 1944, Serial No. 539,921

4 Claims. (Cl. 288—2)

This invention relates to oil sealing rings for moving machine parts, and more particularly to an elastic and pliable ring, adapted to seal the annular space between concentric cylindrical surfaces such as the space between the external cylindrical surface of a shaft and an internal cylindrical surface of a housing.

This invention has for an object to provide a channel form sealing ring of pliable and elastic material that has a positioning flange backed by a stiffening ring in such manner as to provide sufficient rigidity to withstand the axial pressure necessary to force the ring into an annular cavity and also to provide an engaging portion that has a high degree of pliability and elasticity and that is capable of adapting itself to the contours of the cavity to form an oil tight seal.

A further object of the invention is to provide a sealing ring that is adapted to be inserted within annular spaces between cylindrical surfaces that is so constructed that both the interior and exterior sealing portions of the ring have a substantial range of yieldability so that the said sealing portions of the ring may accommodate themselves to and have effective sealing engagement with the surfaces between which the ring is placed.

A further object is to provide a sealing ring which has a flexible sealing flange provided with a sealing lip yieldably connected to the end thereof in such manner that fluid pressure acting against the face of the ring will increase the pressure of the sealing lip against the surface with which it has sealing engagement.

With the above and other objects in view, the invention may be said to comprise the sealing ring as illustrated in accompanying drawings hereinafter described and particularly set forth in appended claims, together with such variations and modifications thereof as will be apparent to one skilled in the art to which the invention pertains.

Reference should be had to the accompanying drawings, forming part of this specification, of which—

Figure 1:
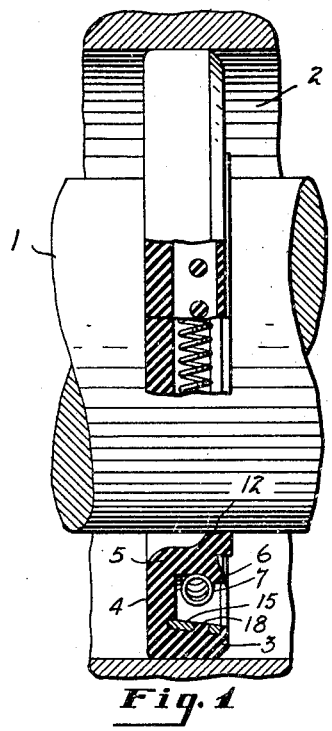
Figure 1 is a fragmentary sectional elevation, showing an assembly comprising a ring embodying the invention, and a shaft and a housing which have concentric cylindrical surfaces between which the ring is interposed.
Figure 2:
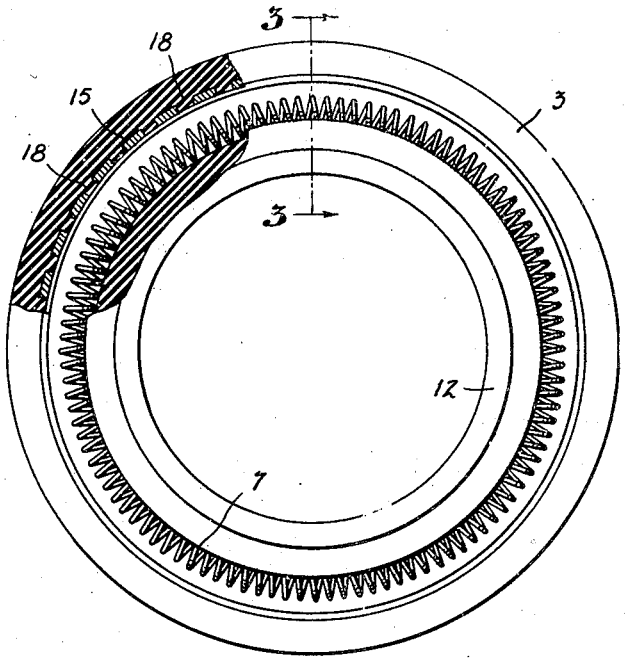
Figure 2 is an end elevation of the assembly with a portion of the ring broken away and shown in the section.
Figure 3:
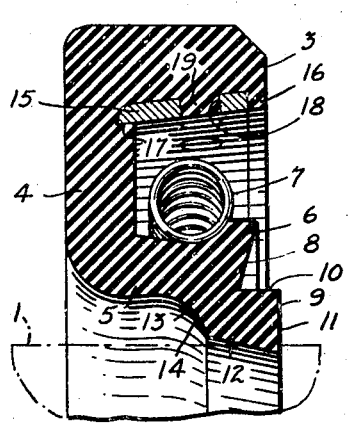
Figure 3 is a section taken on the line indicated at 3—3 in Figure 2.
Figure 4:
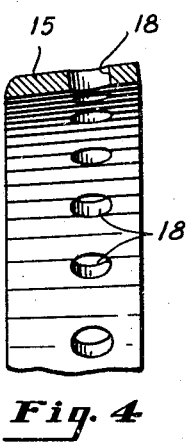
Figure 4 is a fragmentary perspective view of a portion of the stiffening ring.

In the accompanying drawings, the sealing ring of the present invention is shown in the annular space between the external cylindrical surface of a shaft 1 and the internal cylindrical surface of a housing 2.

The body portion of the sealing ring is formed of a moldable elastic and pliable material such as a natural or synthetic rubber, the rubber being preferably oil resistant, the rubber body of the ring being in the form of a laterally facing annular channel and having an outer flange 3, a radial web 4 and an inner flange 5.

The inner flange 5 has along its rim, lip 6, that projects radially into the channel and that serves as a retainer for a spring ring 7, that is mounted on the flange 5 within the channel and that may be in the form of an endless coil spring. The rim of the flange 5 has a face 8 that slants inwardly from the edge of the lip 6, and, projecting axially and radially inwardly from the rim portion of the flange 5, there is a sealing lip 9 that has an outer face 10, extending axially from the inner edge of the slanting face 8, the intersecting faces 8 and 10 forming a recess between the lip 9 and the body of the flange 5. The lip 9 has a flat end face 11, and a conical interior face 12 that intersects the end face 11 at an acute angle, to provide a yielding edge adapted to maintain sealing engagement with the shaft 1. The lip 9 has an inner curved face 13, which is so disposed with respect to the annular recess formed by the faces 8 and 10, that the lip 9 is flexibly connected to the body of the flange 5 by a restricted annular neck portion 14 about which the annular lip 9 may flex to accommodate itself to the shaft 1. The wiping lip 9, connected to the body of the flange by the short neck 14 which abruptly increases in section toward the flange, has both the strength and elasticity required of a good seal. The ability of the sealing lip 9 to flex about the restricted neck 14 provides an effective seal against fluid under pressure since pressure acting against the face of the ring will increase the pressure of the lip 9 against the cylindrical surface with which it engages.

A metal stiffening ring 15 is mounted upon the interior of the flange 3. The ring 15 is of conical form tapering from the side of the ring to which the channel opens toward the web 4. The rubber body of the sealing ring is preferably moulded and vulcanized upon the stiffening ring 15 which may be placed upon the core that fills the channel of the ring during the molding operation. The inner face of the flange 3 has an annular retaining lip 16 that overlies the edge of the ring 15 at its larger end. The smaller end of the ring 15 projects a short distance into the web 4 so that an annular shoulder 17 of rubber engages the interior of the ring at its small end. The ring is provided with a circumferential row of openings 18 in which projections 19 of the rubber body fit. The ring 15 is firmly held in place within the ring channel by the lip 16, shoulder 17 and projections 19.

The sealing ring of the present invention has a considerable range of radial compressibility both interiorly and exteriorly of the rigid reinforcing ring 15.

The conical form of the ring 15 provides an elastic deformable cushion between the ring 15 and the housing wall, which facilitates the entry of the ring into openings of less diameter than the ring, and which enables the ring to conform more readily to surfaces that have portions of different diameters or which may vary from true circular form to a greater extent by reason of the tapering form of the rubber cushion provided by the flange 3. Also compression of the rubber between the ring 15 and housing wall causes the rubber to press radially inwardly on the elastic web 4 and stiffen the same, so as to assist the interior lip 9 to maintain effective sealing engagement with the shaft 1.

The flange 3 serves as a positioning flange, while the flange 5 is adapted to have sealing engagement with the surface of a rotating shaft. The annular spring 7 bears against the interior face of the flange 5, between the sealing lip 9 and the web 4 to which the flange is connected, and exerts a radial pressure on the flange, to retain the tip of the wiping lip 9 in engagement with the shaft 1. Since the lip 9 is flexibly connected to the rim portion of the flange 5, and the flange 5 is flexibly connected to the positioning flange 3 by the web 4, it has a considerable range of yieldability. By reason of its flexible connection to the flange 5 the lip 9 may yield to accommodate shafts of different diameters or to accommodate a shaft offset slightly from concentric position without the creation of excessive friction due to pressure on the engaging surface 12 of the wiping lip. The range of expansion and contraction of the wiping lip is increased considerably by reason of the fact that both the flange 5 and web 4 are flexible.

Figure 5:
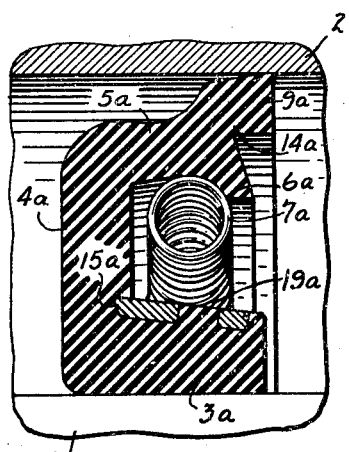
Figure 5 is a section similar to Figure 3, showing a ring which has its yieldable sealing lip on its external periphery.

In Figure 5 of the drawing, a modification is shown in which the positioning and sealing flanges of the ring are reversed. In this view, parts corresponding to those shown in Figures 1 to 4 are indicated by the same reference numerals, with the letter *a* added.

The sealing ring shown in Figure 5 has a positioning flange 3a that is adapted to engage the external cylindrical surface of the shaft 1, a sealing lip 9a that is adapted to engage the internal cylindrical surface of the housing 2, a stiffening ring 15a and a spring 7a that exerts a radial outward pressure on the flange 5a instead of inwardly.

By mounting a conical stiffening ring in the channel of the rubber body portion of the ring, a relatively thick elastic and compressible body of rubber is interposed between the stiffening ring and the cylindrical surface engaged by the exterior surface of the flange so that there may be an appreciable variation in the diameter of the cylindrical surface engaged by the positioning flange. The compressibility of the positioning flange together with the yieldability of the sealing flange and lip enables the sealing ring of the present invention to be used between cylindrical surfaces whose diameters and concentricity have not been held to a close tolerance.

It is to be understood that the particular structures herein illustrated and described may be modified without departing from the invention as defined by the appended claims.

What I claim is:

1. A sealing ring for insertion between concentric cylindrical surfaces comprising a body of elastic and pliable material having the form of a laterally facing channel with radially spaced annular positioning and sealing flanges and a connecting web, said positioning flange having a cylindrical outer face for engagement with one of said concentric surfaces and a conical inner face, said sealing flange having a projecting annular sealing lip for engagement with the other of said cylindrical surfaces, an annular spring within the channel bearing against said sealing flange, and a stiffening ring of conical form fitting within the conical inner face of said positioning flange.

2. A sealing ring for insertion between concentric cylindrical surfaces comprising a body of elastic and pliable material having the form of a laterally facing channel with radially spaced annular positioning and sealing flanges and a connecting web, said positioning flange having a cylindrical outer face for engagement with one of said concentric surfaces and a conical inner face that tapers toward said web, said positioning flange having an annular inwardly projecting retaining lip along the edge thereof and circumferentially spaced projections on its inner face, said sealing flange having a projecting annular sealing lip for engagement with the other of said cylindrical surfaces, and a stiffening ring of conical form fitting the conical face of said positioning flange inwardly of said retaining lip and having openings which receive said circumferentially spaced projections.

3. A sealing ring for insertion between concentric cylindrical surfaces comprising a body of elastic and pliable material having an annular positioning flange, a radially spaced annular sealing flange and a connecting web forming a laterally facing annular channel, said positioning flange having a cylindrical exterior face for engagement with one of said concentric cylindrical surfaces, said sealing flange having an annular sealing lip in the form of an extension projecting radially from its exterior face along its rim and axially beyond said rim, said sealing lip being flexibly connected to the body of the flange by a restricted neck portion and having a conical peripheral face for engagement with the other of said concentric cylindrical surfaces, said conical face intersecting the end face of the lip at an acute angle, and an annular spring within the channel seated upon the sealing flange inwardly of its retaining lip for exerting a radial pressure thereon.

4. A sealing ring for insertion between concentric cylindrical surfaces comprising a body of elastic and pliable material having an annular positioning flange, a sealing flange spaced radially from the positioning flange and a connecting web forming a laterally facing annular channel, said positioning flange having a cylindrical exterior face for engagement with one of the concentric cylindrical surfaces, said sealing flange having an annular sealing lip in the form of an extension projecting radially from its exterior face along its rim and axially beyond said rim, said sealing lip being flexibly connected to the body of the flange by a restricted neck portion and having a conical peripheral face for engagement with the other of said concentric cylindrical surfaces, said conical face slanting from the edge of the lip toward the body of the sealing flange, stiffening means for the positioning flange for resisting deformation thereof, and an annular spring acting upon said sealing flange between said web and said sealing lip for exerting a radial pressure on said flange in a direction to apply pressure to the sealing lip.

THOMAS H. WINKELJOHN.

REFERENCES CITED

The following references are of record in the file of this patent:

UNITED STATES PATENTS

| Number | Name | Date |
|---|---|---|
| 2,181,203 | Reynolds | Nov. 28, 1939 |
| 2,213,116 | Bernstein | Aug. 27, 1940 |
| 2,316,713 | Proctor | Apr. 13, 1943 |
| 2,249,141 | Johnson | July 15, 1941 |

FOREIGN PATENTS

| Number | Country | Date |
|---|---|---|
| 479,743 | British | of 1938 |